United States Patent
Kuang

(10) Patent No.: US 10,160,686 B2
(45) Date of Patent: Dec. 25, 2018

(54) OPTICAL GLASS, OPTICAL PREFORM AND OPTICAL ELEMENT

(71) Applicant: CDGM GLASS CO., LTD., Chengdu, Sichuan Province (CN)

(72) Inventor: Bo Kuang, Chengdu (CN)

(73) Assignee: CDGM GLASS CO., LTD., Chengdu (CN)

(*) Notice: Subject to any disclaimer, the term of this patent is extended or adjusted under 35 U.S.C. 154(b) by 0 days.

(21) Appl. No.: 15/631,305

(22) Filed: Jun. 23, 2017

(65) Prior Publication Data

US 2017/0369360 A1   Dec. 28, 2017

(30) Foreign Application Priority Data

Jun. 24, 2016 (CN) .......................... 2016 1 0475273

(51) Int. Cl.
| | | |
|---|---|---|
| *C03C 3/247* | (2006.01) | |
| *C03C 4/02* | (2006.01) | |
| *C03C 4/08* | (2006.01) | |
| *G02B 1/04* | (2006.01) | |
| *G02B 3/00* | (2006.01) | |

(52) U.S. Cl.
CPC ................ *C03C 3/247* (2013.01); *C03C 4/02* (2013.01); *G02B 1/041* (2013.01); *G02B 3/0087* (2013.01); *C03C 4/08* (2013.01); *C03C 4/085* (2013.01)

(58) Field of Classification Search
CPC .. C03C 3/247; C03C 3/17; C03C 4/02; C03C 4/08; C03C 4/082; C03C 4/085
See application file for complete search history.

(56) References Cited

U.S. PATENT DOCUMENTS

| | | |
|---|---|---|
| 2006/0223689 A1 | 10/2006 | Ikenishi et al. |
| 2007/0027017 A1* | 2/2007 | Hachitani ............... C03C 3/068 501/47 |
| 2007/0060464 A1* | 3/2007 | Ikenishi .................... C03B 7/12 501/48 |
| 2009/0247386 A1 | 10/2009 | Ikenishi |
| 2009/0247388 A1 | 10/2009 | Ikenishi |
| 2009/0325774 A1 | 12/2009 | Ikenishi |
| 2010/0113247 A1 | 5/2010 | Ikenishi |
| 2010/0292066 A1 | 11/2010 | Zou et al. |
| 2012/0111062 A1 | 5/2012 | Ikenishi et al. |
| 2013/0214218 A1* | 8/2013 | Sun ......................... C03C 3/247 252/587 |
| 2015/0299029 A1 | 10/2015 | Tachiwana et al. |
| 2015/0329411 A1* | 11/2015 | Sun ......................... C03C 3/247 252/587 |
| 2016/0122230 A1 | 5/2016 | Shiota |
| 2016/0221864 A1* | 8/2016 | Kuang .................... C03C 3/247 |

FOREIGN PATENT DOCUMENTS

| | | |
|---|---|---|
| CN | 101274814 | 10/2008 |
| CN | 101666884 | 3/2010 |
| CN | 101786792 | 7/2010 |
| CN | 101993195 | 3/2011 |
| CN | 102260043 | 11/2011 |
| CN | 102674689 | 9/2012 |
| CN | 103524038 | 1/2014 |
| JP | 2012012282 | 1/2012 |
| JP | 2016023111 A * | 2/2016 |
| JP | 2016113348 A * | 6/2016 |
| TW | 201400431 | 1/2014 |

OTHER PUBLICATIONS

English translation of Office Action dated Feb. 15, 2017 from corresponding application No. CN 201610475273.0.
English translation of the first search report from corresponding application No. CN 201610475273.0, dated Feb. 9, 2017.

* cited by examiner

*Primary Examiner* — Elizabeth A. Bolden
(74) *Attorney, Agent, or Firm* — Hauptman Ham, LLP

(57) ABSTRACT

The invention provides an optical glass having excellent precision molding performance and having a refractive index of 1.46-1.53 and an Abbe number of 77-84. The optical glass comprises the following components based on cations in the molar percentage: $P^{5+}$: 10-35%, $Al^{3+}$: 10-35%, $Ba^{2+}$: 1-20%, $Sr^{2+}$: 10-35%, $Ca^{2+}$: 1-20%, $Gd^{3+}$: 0-10%, and $Na^+$: 0-10%; the ratio of $Sr^{2+}/(Gd^{3+}+Na^+)$ being 1-30; anions comprising $F^-$ and $O^{2-}$, wherein the ratio $F^-/P^{5+}$ of $F^-$ content relative to the total molar percentage of anions to $P^{5+}$ content relative to the total molar percentage of cations is 2.5 or more. The invention by rationally adjusting the proportions of the components, the molding performance of the optical glass is improved, and the problem that glass is broken and forms fogs during the molding process is solved, thereby the yield in manufacturing optical elements is improved.

20 Claims, No Drawings

OPTICAL GLASS, OPTICAL PREFORM AND OPTICAL ELEMENT

TECHNICAL FIELD

The invention relates to a low-refraction and low-dispersion optical glass, and in particular to a low-refraction and low-dispersion fluorophosphate optical glass, an optical perform and an optical element.

BACKGROUND ART

In recent years, with the fast spread of digital cameras, video cameras and camera-phones, optical materials are also rapidly developed towards the direction of high precision and miniaturization, in order to meet above requirements, the optical design using non-spherical lens has become the mainstream; at the same time, the low-cost high-yield precision press-molding technology in the manufacture of optical components is increasingly taken seriously. The fluorophosphate optical glass as a widely-used novel glass material, with the properties of low dispersion and low refractive index, in the optical system can eliminate special dispersion of secondary spectrum, improve the resolution, greatly improve the imaging quality of the optical system, and has a lower softening temperature, so the fluorophosphates optical glass can be directly processed to high-grade non-spherical lenses by precision molding.

In the prior art, the fluorophosphate optical glass which have a refractive index of 1.46-1.53 and an Abbe number of 77-84 is liable to be broken or cracked during precision molding process, and is often accompanied with the generation of white turbidity or fog on the glass surface, thus the prior fluorophosphates optical glass cannot make effective optical components and production yield is low.

SUMMARY OF THE INVENTION

The technical problem solved by the invention is to provide an optical glass having excellent precision molding performance and having a refractive index of 1.46-1.53 and an Abbe number of 77-84.

The invention also provides an optical preform and an optical element formed of the optical glass mentioned above.

The technical solution to the technical problem of the invention is as follows: the optical glass, comprising the following components based on cations in the molar percentage: $P^{5+}$: 10-35%, $Al^{3+}$: 10-35%, $Ba^{2+}$: 1-20%, $Sr^{2+}$: 10-35%, $Ca^{2+}$: 1-20%, $Gd^{3+}$: 0-10%, and $Na^+$: 0-10%, the ratio of $Sr^{2+}/(Gd^{3+}+Na^+)$ being 1-30; anions comprising $F^-$ and $O^{2-}$, wherein the ratio $F^-/P^{5+}$ of $F^-$ content relative to the total molar percentage of anions to $P^{5+}$ content relative to the total molar percentage of cations is 2.5 or more.

Further, the optical glass also comprises the following components based on cations in the molar percentage: $Mg^{2+}$: 0-15%, $Y^{3+}$: 0-10%, $La^{3+}$: 0-10%, $Yb^{3+}$: 0-10%, $Li^+$: less than 4%, $K^+$: 0-10%, $Zn^{2+}$: 0-10%, $Nb^{5+}$: 0-10%, $Ti^{4+}$: 0-10%, and $Zr^{4+}$: 0-10%.

The optical glass comprises the following components based on cations in the molar percentage: $P^{5+}$: 10-35%, $Al^{3+}$: 10-35%, $Ba^{2+}$: 1-20%, $Sr^{2+}$: 10-35%, $Ca^{2+}$: 1-20%, $Mg^{2+}$: 0-15%, $Gd^{3+}$: 0-10%, $Y^{3+}$: 0-10%, $Na^+$: 0-10%, $La^{3+}$: 0-10%, $Yb^{3+}$: 0-10%, $Li^+$: less than 4%, $K^+$: 0-10%, $Zn^{2+}$: 0-10%, $Nb^{5+}$: 0-10%, $Ti^{4+}$: 0-10%, and $Zr^{4+}$: 0-10%.

The optical glass consists of the following components based on cations in the molar percentage: $P^{5+}$: 10-35%, $Al^{3+}$: 10-35%, $Ba^{2+}$: 1-20%, $Sr^{2+}$: 10-35%, $Ca^{2+}$: 1-20%, $Mg^{2+}$: 0-15%, $Gd^{3+}$: 0-10%, $Y^{3+}$: 0-10%, $Na^+$: 0-10%, $La^{3+}$: 0-10%, $Yb^{3+}$: 0-10%, $Li^+$: less than 4%, $K^+$: 0-10%, $Zn^{2+}$: 0-10%, $Nb^{5+}$: 0-10%, $Ti^{4+}$: 0-10%, and $Zr^{4+}$: 0-10%.

Further, wherein, $P^{5+}$: 15-30%, and/or $Al^{3+}$: 15-25%, and/or $Ba^{2+}$: 3-18%, and/or $Sr^{2+}$: 15-35%, and/or $Ca^{2+}$: 1-15%, and/or $Mg^{2+}$: 1-10%, and/or $Gd^{3+}$: 0.5-8%, and/or $Na^+$: 0.5-8%, and/or $Y^{3+}$: 0-5%, and/or $La^{3+}$: 0-5%, and/or $Yb^{3+}$: 0-5%, and/or $Li^+$: less than 1%, and/or $K^+$: 0-5%, and/or $Zn^{2+}$: 0-5%, and/or $Nb^{5+}$: 0-5%, and/or $Ti^{4+}$: 0-5%, and/or $Zr^{4+}$: 0-5%.

Further, wherein, $P^{5+}$: 16-26%, and/or $Al^{3+}$: 18-25%, and/or $Ba^{2+}$: 5-15%, and/or $Sr^{2+}$: 20-35%, and/or $Ca^{2+}$: 1-10%, and/or $Mg^{2+}$: 1-7%, and/or $Gd^{3+}$: 1-5%, and/or $Na^+$: 1-5%, and/or $Y^{3+}$: 0-3%, and/or $La^{3+}$: 0-1%, and/or $Yb^{3+}$: 0-1%, and/or $K^+$: 0-1%, and/or $Zn^{2+}$: 0-1%, and/or $Nb^{5+}$: 0-1%, and/or $Ti^{4+}$: 0-1%, and/or $Zr^{4+}$: 0-1%.

Further, wherein $Sr^{2+}/(Gd^{3+}+Na^+)$ is 1-18, and/or the sum of $Gd^{3+}+Y^{3+}+La^{3+}+Yb^{3+}$ is 1-20%, and/or $Na^+/(Gd^{3+}+Na^+)$ is 0.8 or less, and/or $Sr^{2+}/(Gd^{3+}+Y^{3+})$ is 3-18, and/or $Sr^{2+}>P^{5+}$.

Further, wherein $F^-/P^{5+}$ is 2.5-5.5, and/or $Sr^{2+}/(Gd^{3+}+Na^+)$ is 2-10, and/or the sum of $Gd^{3+}+Y^{3+}+La^{3+}+Yb^{3+}$ is 1-10%, and/or $Na^+/(Gd^{3+}+Na^+)$ is 0.2-0.7, and/or $Sr^{2+}/(Gd^{3+}+Y^{3+})$ is 3-15, and/or $Sr^{2+}>P^{5+}+1\%$.

Further, wherein $F^-/P^{5+}$ is 2.8-4.5, and/or the sum of $Gd^{3+}+Y^{3+}+La^{3+}+Yb^{3+}$ is 1-5%, and/or $Na^+/(Gd^{3+}+Na^+)$ is 0.3-0.6, and/or $Sr^{2+}/(Gd^{3+}+Y^{3+})$ is 5-12, and/or $Sr^{2+}>P^{5+}+2\%$.

Further, the optical glass based on the molar percentage of anions comprises: $F^-$: 60-80%, and $O^{2-}$: 20-40%.

Further, the optical glass based on the molar percentage of anions comprises: $F^-$: 64-75%, and $O^{2-}$: 25-36%

Further, the optical glass based on the molar percentage of anions comprises: $F^-$: 65-70%, and $O^{2-}$: 30-35%.

Further, the refractive index is 1.46-1.53; the Abbe number is 77-84; the transition temperature is 470° C. or less; the resistance to moist atmosphere stability is above Grade 2; the acid resistance stability is above Grade 2; the density is 4.30 g/cm³ or less; when the transmittance is 80%, the corresponding wavelength $\lambda_{80}$ is less than or equal to 340 nm, and when the transmittance is 5%, the corresponding wavelength $\lambda_5$ is less than or equal to 290 nm.

An optical preform is made of the optical glass mentioned above.

An optical element is made of the optical glass mentioned above.

The invention has the advantages that: by rationally adjusting the ratio of the components, the molding performance of the optical glass is fundamentally improved, and the problem that the optical glass having a refractive index of 1.46-1.53 and an Abbe number of 77-84 may be broken or form fog during the molding process is effectively solved, thereby the yield of optical elements production is greatly improved.

DETAILED DESCRIPTION OF THE INVENTION

The optical glass of the invention contains $P^{5+}$, $Al^{3+}$ and alkaline earth metals as cationic components and $O^{2-}$ and $F^-$ as anionic components, wherein, the ratio $F^-/P^{5+}$ of $F^-$ content relative to the total molar percentage of anions to $P^{5+}$ content relative to the total molar percentage of cations is 2.5 or more, and the refractive index (nd) is 1.46-1.53 and the Abbe number ($\nu_d$) is 77-84.

I. Optical Glass

Each component constituting of the optical glass of the invention will be described below.

In the description, unless otherwise indicated, in term of the content of each component, the content of a cationic component is represented by the percentage of the cation in the total molar amount of all cations, and the content of an anionic component is represented by the percentage of the anion in the total molar amount of all anions. Also, in the following description, "a predetermined value or less", or "a predetermined value or more" includes the predetermined value.

It should be noted that the ion valence of each component is a representative value for convenience, which is not different from other ion valence. There is a possibility that the ion valence of each component in the optical glass is present in a value other than the representative value. For example, P is usually present in the 5 valence state in the glass, thus "$P^{5+}$" is used herein as the representative value, but it is possible to be present in other ion valence state, which also falls within the scope of the invention.

The optical glass of the invention has an Abbe number of 77-84, when manufacturing the fluorophosphate glass having such low dispersion, the volatilization trend of fluorine is increased, particularly in the precision molding process, although the optical glass has been molded, due to the presence of fluorine, the glass is unstable and liable to be broken, form fog or white turbidity. The inventor has found that, when controlling the ratio of $F^-$ to $P^{5+}$ content, such that the ratio $F^-/P^{5+}$ of $F^-$ content relative to the total molar percentage of anions to $P^{5+}$ content relative to the total molar percentage of cations is 2.5 or more, the coordination of $F^-$ and $P^{5+}$ is optimum, so the each component is stable and in balance between the glass network, which can effectively inhibit the activity of each component in the glass during the molding process and reduce the probability of breakage and fog formation, thereby greatly increasing the yield of optical element products. Accordingly, in the invention, the $F^-/P^{5+}$ ratio is 2.5 or more, preferably 2.5-5.5, more preferably 2.8-4.5.

Regarding Cationic Components $P^{5+}$ is a key cationic component of the glass network formation, and when its content is less than 10%, the stability of the glass is reduced. On the other hand, the $P^{5+}$ content is controlled to be 35% or less, which can inhibit the devitrification of the glass and inhibit the decrease of Abbe number of the glass, and can easily obtain the stable glass with a low dispersion. Accordingly, the $P^{5+}$ content is defined to be 10-35%, preferably 15-30%, more preferably 16-26%, even more preferably 18-25%. Using for example metaphosphoric acid, metaphosphates, $P_2O_5$, phosphoric acid, phosphates and the like as a raw material may introduce $P^{5+}$.

$Al^{3+}$ is a key component of the glass network in the glass of the invention, can effectively improve the mechanical property and chemical resistance of the glass, and can reduce the average coefficient of linear expansion of the glass. When the $Al^{3+}$ content is less than 10%, it is difficult to form a stable glass network and provide the above effects; when the $Al^{3+}$ content is more than 35%, the transition temperature and liquidus temperature of the glass are greatly increased, leading to the difficulty in melting, and the temperature increases at the time of molding, resulting in increased volatility of the glass and making the glass stripes deteriorate, at the same time if the transition temperature is too high, the temperature will make molding difficult. Accordingly, the $Al^{3+}$ content is 10-35%, preferably 15-30%, more preferably 15-25%, more preferably 18-25%. In the invention, $Al^{3+}$ may be introduced using fluorides and oxides of Al, Al-containing salts and the like.

The addition of $Ba^{2+}$ can properly increase the refractive index of the glass, and also is effective for improving the chemical stability of the glass, especially to improve the weather resistance, however, the addition of excessive $Ba^{2+}$ may greatly weaken the stability of the glass resistance to devitrification and increase the transition temperature of the glass. Accordingly, in the invention, the $Ba^{2+}$ content is limited to 1-20%, preferably 3-18%, more preferably 5-15%. In the invention, $Ba^{2+}$ may be introduced using fluorides and oxides of Ba, Ba-containing salts and the like.

$Sr^{2+}$ is effective for improving the glass resistance to devitrification, and can effectively adjust the refractive index and specific gravity of the glass, however, however if the content of $Sr^{2+}$ is too high, the content of $Sr^{2+}$ may increase the refractive index and the dispersion of the glass, so achieving the predefined optical properties is difficult, and may also reduce the chemical stability of the glass. Accordingly, the $Sr^{2+}$ content is limited to 10-35%, preferably 15-30%, more preferably 20-35%, even more preferably 20-30%. In the invention, the $Sr^{2+}$ content being greater than the $P^{5+}$ content is advantageous for improving the glass forming property of the glass, especially when $Sr^{2+}>P^{5+}+$ 1%, the glass forming property can be greatly improved, more preferably $Sr^{2+}>P^{5+}+2\%$. In the invention, $Sr^{2+}$ may be introduced using fluorides and oxides of Sr, Sr-containing salts and the like.

$Ca^{2+}$ present in the glass not only can reduce the Abbe number and specific gravity of the glass, but also stabilize the formation of the glass, if its content is too low, the effect is not obvious; if its content is too high, the glass resistance to devitrification is deteriorated. Accordingly, in the invention, the $Ca^{2+}$ content is limited to 1-20%, preferably 1-15%, more preferably 1-10%. In the invention, $Ca^{2+}$ may be introduced using fluorides and oxides of Ca, Ca-containing salts and the like.

When there is a certain amount of $Mg^{2+}$, the glass resistance to devitrification can be improved, however, if the $Mg^{2+}$ content exceeds 15%, the glass resistance to devitrification is deteriorate. Accordingly, the $Mg^{2+}$ content is limited to 0-15%. In the invention, the $Mg^{2+}$ content is preferably 1% or more, the wear degree of the glass can be reduced, to obtain the glass having high abrasive machinability. Accordingly, the $Mg^{2+}$ content is preferably 1-10%, more preferably 1-7%. In the invention, $Mg^{2+}$ may be introduced using fluorides and oxides of Mg, Mg-containing salts and the like.

$Y^{3+}$ can improve the refractive index and the resistance to devitrification of the glass, if its content is more than 10%, the refractive index of the glass will beyond the designed requirement. Accordingly, the $Y^{3+}$ content is less than 10%, preferably less than 5%, more preferably less than 3%, more preferably less than 1%. In the invention, $Y^{3+}$ may be introduced using fluorides and oxides of Y, Y-containing salts and the like.

$Gd^{3+}$ can improve the stability and durability of the glass, and maintain low dispersion while appropriately improving the refractive index, at the same time appropriately improve the mechanical strength. If its content exceeds 10%, the liquidus temperature and transition temperature of the glass increase, and the stability of the glass decreases. Accordingly, the $Gd^{3+}$ content is 0-10%. If the $Gd^{3+}$ content in the glass of the invention is 0.5% or more, the glass resistance to devitrification can be greatly improved, and the glass forming property of the invention can be improved. Accordingly, the $Gd^{3+}$ content is preferably 0.5-8%, more preferably 1-5%. In the invention, $Gd^{3+}$ may be introduced using fluorides and oxides of Gd, Gd-containing salts and the like.

In the invention, particularly when the ratio of $Gd^{3+}$, $Sr^{2+}$ and $Na^+$, $Sr^{2+}/(Gd^{3+}+Na^+)$ is 1-30, the occurrence of fog and white turbidity in the glass molding process can be effectively inhibited, and the ratio of $Sr^{2+}/(Gd^{3+}+Na^+)$ is preferably 1-18, more preferably 2-10.

If $Gd^{3+}$, $Sr^{2+}$ and $Y^{3+}$ are mixed and dissolved in a certain ratio, the crystallization of the glass can be effectively inhibited, if the ratio of $Sr^{2+}/(Gd^{3+}+Y^{3+})$ is 3-18, the crystallization resistance is best, including the internal crystallization resistance and the surface crystallization resistance, and the ratio of $Sr^{2+}/(Gd^{3+}+Y^{3+})$ is preferably 3-15, more preferably 5-12, still more preferably 5-10.

The appropriate addition of $La^{3+}$, $Yb^{3+}$ and other rare earth elements can effectively adjust the refractive index and dispersion of the glass, if its content is excessive, the refractive index of the glass will beyond the designed value and will cause the stability of the glass decreased. Accordingly, its content is respectively 0-10%, preferably 0-5%, more preferably 0-1%. In the invention, $La^{3+}$ and $Yb^{3+}$ may be introduced using $La_2O_3$, $LaF_3$, $Yb_2O_3$, $YbF_3$ and the like.

In the invention, preferably the sum of trivalent cations $Gd^{3+}+Y^{3+}+La^{3+}+Yb^{3+}$ is controlled to be 1% or more, which can greatly improve the chemical stability and optical property of the glass, however if the sum of $Gd^{3+}+Y^{3+}+La^{3+}+Yb^{3+}$ exceeds 20%, the refractive index will beyond the predefined value, accordingly, the sum of $Gd^{3+}+Y^{3+}+La^{3+}+Yb^{3+}$ is preferably 1-20%, more preferably 1-10%, even more preferably 1-5%.

The addition of $Li^+$ to the glass can effectively reduce the Tg temperature of the glass, however, when containing $Li^+$ glass is used in the precision molding process, the risk of blurring the surface of the glass element is liable to occur, because the die is usually coated with C-containing mold-release agent, $Li^+$ in the glass is easily to react with carbon in the mold-release agent, producing rough opaque layers on the surface of original glass parts. Accordingly, in the invention, the $Li^+$ content is limited to be less than 4%, preferably less than 1%, more preferably zero. In the invention, $Li^+$ may be introduced using fluorides and oxides of Li, Li-containing salts and the like.

$Na^+$ can improve the melting property of the glass and reduce the yield point and liquidus temperature of the glass, however, if its content exceeds 10%, the deterioration of crystallization resistance of the glass is accelerated, and the time required for the glass changing from liquid state to solid state during the cooling-molding process is prolonged, providing the condition for crystallization. Accordingly, the $Na^+$ content is controlled to be 10% or less. In the invention, by making the $Na^+$ content more than 0.5%, the transmittance of the glass can be greatly improved, this is that using other alkali metals (such as Li, K and Cs) cannot achieve. Accordingly, the $Na^+$ content is preferably 0.5-8%, more preferably 1-5%. In the invention, $Na^+$ may be introduced using fluorides and oxides of Na, Na-containing salts and the like.

After extensive research, the inventor has found that when the ratio of $Na^+/(Gd^{3+}+Na^+)$ is 0.8 or less, the shortwave transmittance is excellent, particularly when the ratio is 0.2-0.7, the shortwave transmittance is best, and the ratio is more preferably 0.3-0.6.

In the invention, $K^+$ is an optional component, which can maintain the glass resistance to devitrification and reduce Tg temperature of the glass during the glass molding, however when its content exceeds 10%, the water resistance of the glass is deteriorated. Accordingly, the $K^+$ content is limited to be 10% or less, preferably 5% or less, more preferably 1% or less. In the invention, $K^+$ may be introduced using fluorides and oxides of K, K-containing salts and the like.

$Zn^{2+}$ is a component capable of improving the glass resistance to devitrification and reducing the Tg Temperature of the glass, and is an optional component in the optical glass of the invention. When the $Zn^{2+}$ content is controlled be 10% or less, the glass resistance to devitrification can be improved, and the decrease of the refractive index of the glass can be appropriately inhibited. Accordingly, the $Zn^{2+}$ content is limited to be 10% or less, preferably 5% or less, more preferably 1% or less. In the invention, $Zn^{2+}$ may be introduced using fluorides and oxides of Zn, Zn-containing salts and the like.

$Nb^{5+}$ belongs to a high-refraction and high dispersion component, adding $Nb^{5+}$ to the glass components can improve the refractive index of the glass and adjust the Abbe number of the glass. In the glass according to the invention, if the $Nb^{5+}$ content is more than 10%, the refractive index and Abbe number of the glass cannot meet the designed requirements, and the crystallization resistance of the glass will be deteriorated severely. Accordingly, the $Nb^{5+}$ content is 0-10%, preferably 0-5%, more preferably 0-1%.

The addition of $Zr^{4+}$ can appropriately inhibit the formation of volatilization-induced stripes in the glass, if the $Zr^{4+}$ content exceeds 10%, the optical coefficients are hard to control, accordingly, the $Zr^{4+}$ content is limited to be 10% or less, preferably 5% or less, more preferably 1% or less. In the invention, $Zr^{4+}$ may be introduced using fluorides and oxides of Zr, Zr-containing salts and the like.

$Ti^{4+}$ can improve the stability of resistance to devitrification of the glass, if the $Ti^{4+}$ content is more than 10%, the refractive index of the glass is increased, and the transmittance is reduced. Accordingly, the $Ti^{4+}$ content is limited to be 0-10%, preferably 0-5%, more preferably 0-1%.

Regarding Anionic Components $F^-$ has a greater effect on improving the light refractivity and reducing the refractive index, temperature coefficient and Tg, and is a key component for improving the Abbe number and abnormal dispersion. If the $F^-$ content is too high, the $F^-$ content weakens the stability of the glass, increases the thermal expansion coefficient and wear degree, particularly during the melting process, the volatilization of F not only will cause environmental pollution, but also will make the optical data of the glass beyond the designed range. When the $F^-$ content is less than 60%, the Abbe number and abnormal dispersion cannot meet the designed requirements. If the $F^-$ content is more than 80%, the Abbe number of the glass becomes too large, and when melting and used in precision molding process the volatilization will increase dramatically, accordingly, the $F^-$ content is limited to be 60-80%. In the invention, when the $F^-$ content is less than 64%, the breakage rate of the glass during the molding process is not greatly reduced, when the $F^-$ content is more than 64%, the fogging phenomenon of the glass during the molding process is completely eliminated, and the yield is greatly improved, accordingly, the $F^-$ content is preferably 64-75%, more preferably 64-70%. $F^-$ may be introduced using various fluoride materials.

The optical glass of the invention contains $O^{2-}$, and particularly, by containing 20% or more of $O^{2-}$, the increase of devitrification and wear degree of the glass can be inhibited. Accordingly, the lower limit of $O^{2-}$ content is limited to be 20%, preferably 25% is the lower limit, more preferably 30% is the lower limit. On the other hand, by limiting the $O^{2-}$ content to be 40% or less, the $O^{2-}$ content helps to improve the molding property of the glass, accordingly, the upper limit of $O^{2-}$ content is limited to be 40%, preferably 36% is the upper limit, more preferably 35% is the upper limit. $O^{2-}$ may be introduced using oxides and various salt materials and the like.

In view of inhibiting the devitrification of the glass, the total content of $F^-$ and $O^{2-}$ is preferably 98% or more, more preferably 99% or more, even more preferably 99.5% or more.

Regarding Other Components

Without departing from the scope of the glass property of the invention, if necessary, Ta, W, Ge, Bi, Te and other components can be added to the optical glass of the invention.

Regarding Components That Should Not be Contained

Without departing from the scope of the glass property of the invention, if necessary, other components that have not been mentioned above can be added. However, transition metal components, such as Ce, V, Cr, Mn, Fe, Co, Ni, Cu, Ag and Mo, even if they are contained alone or in combination in a small amount, the glass is colored and absorbed at a certain wavelength in the visible light region, thereby weakening the properties of the visible light transmittance effect of the invention, accordingly, in particular, for the optical glass, which has requirement for the transmittance of the wavelength of the visible light region, preferably the transition metal components are not actually contained.

In recent years, cations Pb, Th, Cd, Tl, Os, Be and Se were recognized as harmful chemicals, and there is a trend to control to use them, which is a necessary measure for environmental protection in not only the glass manufacturing process, even to the processing steps and the disposal after productization. Accordingly, in the case of attaching importance to the environmental influence, except for inevitably incorporated, preferably them are not actually contained. Thus, the optical glass does not actually contain environment-hostile substances. Therefore, even if a measure is not taken in a specific environmental countermeasure, the optical glass of the invention can be manufactured, processed and discarded.

The properties of the optical glass of the invention will be described below.

Optical Constants of the Optical Glass

The optical glass of the invention is the low refractive index and low dispersion glass, a lens made of the glass having low refractive index and low dispersion usually is combined with a lens made of the glass having high refractive index and high dispersion for chromatic correction. From the view of optical properties suitable for its use, the optical glass of the invention has the refractive index nd in the range of 1.46-1.53, preferably in the range of 1.47-1.52, more preferably in the range of 1.48-1.51; The Abbe number $v_d$ of the glass of the invention is in the range of 77-84, preferably in the range of 78-83, more preferably in the range of 79-83.

Coloring of the Optical Glass

The shortwave transmission spectrum property of the glass of the invention is represented by coloration degree $(\lambda_{80}/\lambda_5)$. $\lambda_{80}$ refers to the wavelength corresponding to the glass transmittance of 80%, and $\lambda_5$ refers to the wavelength corresponding to the glass transmittance of 5%. Wherein, the determination of $\lambda_{80}$ is performed using the glass having a thickness of 10±0.1 mm and having two opposite planes parallel to each other and optical polished, measuring the spectral transmittance in the wavelength region from 280 nm to 700 nm and exhibiting a wavelength of 80% transmittance. The so called spectral transmittance or transmittance refers to an amount represented by $I_{out}/I_{in}$ in the case where a light having an incident intensity of $I_{in}$ is perpendicularly incident to the surface of the glass, directed through the glass and a light having an incident intensity of $I_{out}$ intensity is emergent from the other plane, and the amount also includes a transmittance of surface reflection loss on the surface of the glass. The higher the refractive index of the glass, the greater the surface reflection loss. Accordingly, in the glass having a high refractive index, a small value of $\lambda_{80}$ means that the coloration of the glass itself is minimal.

$\lambda_{80}$ of the optical glass of the invention is less than or equal to 340 nm, preferably the range of $\lambda_{80}$ is less than or equal to 335 nm, more preferably the range of $\lambda_{80}$ is less than or equal to 330 nm, more preferably the range of $\lambda_{80}$ is less than or equal to 325 nm, still more preferably the range of $\lambda_{80}$ is less than or equal to 320 nm. $\lambda_5$ is less than or equal to 290 nm, preferably the range of $\lambda_5$ is less than or equal to 285 nm, more preferably the range of $\lambda_5$ is less than or equal to 280 nm, further preferably the range of $\lambda_5$ is less than or equal to 275 nm.

Density of the Optical Glass

The density of the optical glass refers to the mass per unit volume at the temperature of 20° C., represented in units of g/cm³.

The density of the optical glass of the invention is 4.30 g/cm³ or less, preferably 4.20 g/cm³ or less, more preferably 4.10 g/cm³ or less, further preferably 4.00 g/cm³ or less.

Transition Temperatures of the Optical Glass

The optical glass in a certain temperature range will gradually change from the solid state to the plastic state. Transition temperature refers to the temperature corresponding to the intersection of extension of low temperature region linear portion and extension of high temperature region linear portion of a glass sample under heating from room temperature to sag temperature.

The transition temperature Tg of the glass of the invention is 470° C. or below, preferably 465° C. or below, more preferably 460° C. or below, further preferably 450° C. or below.

Water Resistance of the Optical Glass

Resistance to moisture atmospheric stability RC (S) (surface method): the stability against moist atmosphere is divided into three grades, in which, Grade 1: At a temperature of 50° C. and a relative humidity of 85%, the time required for forming hydrolysis spots on a polished surface of the glass is more than 20 h;

Grade 2: At a temperature of 50° C. and a relative humidity of 85%, the time required for forming hydrolysis spots on a polished surface of the glass is 5-20 h;

Grade 3: At a temperature of 50° C. and a relative humidity of 85%, the time required for forming hydrolysis spots on a polished surface of the glass is less than 5 h.

Resistance to moisture atmospheric stability of the glass of the invention is above Grade 2, preferably above Grade 1.

Acid Resistance of the Optical Glass

Acid resistance stability RA (S) (surface method): according to the stability of the role of acid solution is divided into three grades, in which, Grade 1: under the action of an acetic acid solution of 0.1N (equivalent concentration) and temperature of 50° C., the time for the damage depth of the glass polished surface reaching 135 nm is more than 5 h;

Grade 2: under the action of an acetic acid solution of 0.1N and temperature of 50° C., the time for the damage depth of the glass polished surface reaching 135 nm is 1-5 h;

Grade 3: under the action of an acetic acid solution of 0.1N and temperature of 50° C., the time for the damage depth of the glass polished surface reaching 135 nm is less than 1 h.

Acid resistance stability of the glass of the invention is above Grade 2, preferably above Grade 1.

II. Optical Preforms and Optical Elements

The optical preforms and optical elements of the invention will be described below.

The optical preforms and optical elements of the invention are all made of the foregoing optical glass of the invention. The optical preforms of the invention have the properties of low refractive index and low dispersion; and the optical elements of the invention have the properties of low refractive index and low dispersion, providing various optical elements, such as lenses and prisms, of high optical value.

Optical preforms can be manufactured by starting from the obtained optical glass by means of press molding, for example reheating press-molding, precision press-molding or the like. In other words, an optical glass molding blank for molding is made by starting from the optical glass, and the optical glass molding blank is subjected to reheating and compression molding, then subjected to polishing treatment, to make an optical preform. It should be noted that the means for manufacturing the optical preform is not limited to the above.

Optical preforms thus manufactured are useful in various optical elements and optical designs. In particular, preferably from the optical glass of the invention, lenses, prisms, reflectors and other optical elements are manufactured by means of the precision press-molding or the like. Thus, when used in optical elements such as cameras and projectors or the like, so that visible light through the optical devices, realizing high-precision imaging characteristics and to realize the lightweight of these optical instruments is possible.

As examples for lenses, various lenses having spherical or non-spherical surfaces are illustrative, for example, concave meniscus lenses, convex meniscus lenses, double convex lenses, double concave lenses, plano-convex lenses and plano-concave lenses or the like. These lenses are combined with lenses made of the glass having high refractive index and high dispersion to correct the color difference, and suitable as a lens for color correction. In addition, these lenses are very effective for the compaction of optical systems.

III. Examples

The invention will be described with reference to the following examples, but the invention should not be limited to these examples.

The melting and molding method for producing the optical glass can be carried out using techniques well known to those skilled in the art. The glass raw materials (carbonates, nitrates, metaphosphates, fluorides, oxides, etc.) were weighed and mixed evenly according to the proportions of respective ions of the glass, and put into a smelting device (such as a platinum crucible) and after properly stirred, clarified and homogenized at 900-1150° C., and the temperature is cooled to below 900° C., pouring or leakage-injecting into a molding die, and finally subjected to annealing and processing and other post-processing, or by precision molding technology to directly press molding.

Optical Glass Examples

The properties of each glass of the invention were measured by the methods shown below, and the measurement results were shown in Tables 1-7.

(1) Refractive index nd and Abbe number vd

The refractive index and dispersion coefficient were measured in accordance with the method listed in the standard GB/T7962.1-2010.

(2) Glass coloring degree ($\lambda_{80}$, $\lambda_5$)

The spectral transmittance was measured using a glass sample having two optically polished planes opposed each other and having a thickness of 10±0.1 mm, and calculated according to the measurement results.

(3) Glass transition temperature (Tg)

The measurement was carried out in accordance with the standard GB/T7962.16-2010.

(4) Specific gravity (ρ)

The measurement was carried out in accordance with the standard GB/T7962.20-2010.

TABLE 1

| | Examples | | | | | | | | | |
|---|---|---|---|---|---|---|---|---|---|---|
| Components | 1 | 2 | 3 | 4 | 5 | 6 | 7 | 8 | 9 | 10 |
| $P^{5+}$ | 11.24 | 15.24 | 28.36 | 31.35 | 26.32 | 24.36 | 19.24 | 20.34 | 21.06 | 24.56 |
| $Al^{3+}$ | 34.15 | 28.16 | 15.22 | 18.25 | 10.24 | 24.56 | 17.34 | 15.66 | 23.11 | 22.56 |
| $Ba^{2+}$ | 1.32 | 3.34 | 15.16 | 7.33 | 18.31 | 19.52 | 6.21 | 16.24 | 13.5 | 11.85 |
| $Sr^{2+}$ | 34.04 | 28.42 | 15.33 | 20.85 | 16.42 | 11.36 | 33.26 | 17.34 | 27.15 | 20.97 |
| $Ca^{2+}$ | 1.77 | 14.22 | 12.57 | 11.52 | 10.47 | 7.61 | 3.15 | 12.25 | 4.62 | 10.65 |
| $Mg^{2+}$ | 14.21 | 1.46 | 9.28 | 5.34 | 8.24 | 3.44 | 2.47 | 12.41 | 4.12 | 6.08 |
| $Gd^{3+}$ | 1.25 | 4.6 | 2.34 | 1.68 | 2.96 | 1.54 | 9.34 | 0.88 | 3.14 | 2.06 |

TABLE 1-continued

| Components | \multicolumn{10}{c}{Examples} |
| --- | --- | --- | --- | --- | --- | --- | --- | --- | --- | --- |
|  | 1 | 2 | 3 | 4 | 5 | 6 | 7 | 8 | 9 | 10 |
| $Y^{3+}$ | 0.74 | 0 | 0 | 0 | 1.2 | 0 | 0 | 4.31 | 0 | 0 |
| $La^{3+}$ | 0 | 0.31 | 0 | 0 | 0 | 1.25 | 0 | 0 | 0 | 0 |
| $Yb^{3+}$ | 0 | 0 | 0 | 0 | 0.34 | 0.57 | 0 | 0 | 0 | 0 |
| $Li^+$ | 0 | 0.35 | 0 | 3.68 | 0.85 | 0 | 1.38 | 0 | 0 | 0 |
| $Na^+$ | 1.28 | 2.7 | 1.74 | 0 | 4.65 | 2.34 | 7.61 | 0.57 | 3.3 | 1.27 |
| $K^+$ | 0 | 0 | 0 | 0 | 0 | 0.53 | 0 | 0 | 0 | 0 |
| $Zn^{2+}$ | 0 | 1.2 | 0 | 0 | 0 | 0 | 0 | 0 | 0 | 0 |
| $Nb^{5+}$ | 0 | 0 | 0 | 0 | 0 | 1.22 | 0 | 0 | 0 | 0 |
| $Ti^{4+}$ | 0 | 0 | 0 | 0 | 0 | 0.34 | 0 | 0 | 0 | 0 |
| $Zr^{4+}$ | 0 | 0 | 0 | 0 | 0 | 1.36 | 0 | 0 | 0 | 0 |
| $\Sigma cations$ | 100 | 100 | 100 | 100 | 100 | 100 | 100 | 100 | 100 | 100 |
| $F^-$ | 60.34 | 64.25 | 74.14 | 79.22 | 69.25 | 67.51 | 64.22 | 68.17 | 66.87 | 65.44 |
| $O^{2-}$ | 39.66 | 35.75 | 25.86 | 20.78 | 30.75 | 32.49 | 35.78 | 31.83 | 33.13 | 34.56 |
| $\Sigma anions$ | 100 | 100 | 100 | 100 | 100 | 100 | 100 | 100 | 100 | 100 |
| $F^-/P^{5+}$ | 5.3683 | 4.2159 | 2.6142 | 2.527 | 2.6311 | 2.7713 | 3.3378 | 3.3515 | 3.1752 | 2.6645 |
| $Sr^{2+}/(Gd^{3+} + Na^+)$ | 13.455 | 3.8932 | 3.7574 | 12.411 | 2.1577 | 2.9278 | 1.9622 | 11.959 | 4.2158 | 6.2973 |
| $Gd^{3+} + Y^{3+} + La^{3+} + Yb^{3+}$ | 1.99 | 4.91 | 2.34 | 1.68 | 4.5 | 3.36 | 9.34 | 5.19 | 3.14 | 2.06 |
| $Na^+/(Gd^{3+} + Na^+)$ | 0.5059 | 0.3699 | 0.4265 | 0 | 0.611 | 0.6031 | 0.449 | 0.3931 | 0.5124 | 0.3814 |
| $n_d$ | 1.5283 | 1.4965 | 1.4726 | 1.4834 | 1.4921 | 1.5125 | 1.5246 | 1.5025 | 1.5123 | 1.4985 |
| $v_d$ | 77.85 | 80.64 | 82.15 | 83.55 | 81.92 | 80.74 | 78.65 | 81.65 | 80.58 | 81.37 |
| Tg (° C.) | 452.3 | 446.2 | 443.5 | 445.1 | 444.5 | 443.8 | 441.2 | 442.5 | 446.3 | 446.8 |
| $\rho$ (g/cm$^3$) | 4.15 | 4.08 | 4.2 | 4.13 | 3.95 | 3.91 | 3.9 | 4.11 | 4.08 | 3.91 |
| RC(S) | 1 | 1 | 1 | 1 | 1 | 1 | 1 | 1 | 1 | 1 |
| RA(S) | 1 | 1 | 1 | 1 | 1 | 1 | 1 | 1 | 1 | 1 |
| $\lambda 80/\lambda 5$ | 324/275 | 320/268 | 321/270 | 329/278 | 322/271 | 325/275 | 326/274 | 328/276 | 326/277 | 320/272 |

TABLE 2

| Components | \multicolumn{10}{c}{Examples} |
| --- | --- | --- | --- | --- | --- | --- | --- | --- | --- | --- |
|  | 11 | 12 | 13 | 14 | 15 | 16 | 17 | 18 | 19 | 20 |
| $P^{5+}$ | 13.68 | 17.35 | 26.14 | 23.25 | 27.16 | 18.33 | 21.78 | 16.63 | 25.51 | 25.41 |
| $Al^{3+}$ | 31.22 | 20.34 | 17.35 | 27.51 | 25.47 | 23.61 | 21.78 | 32.25 | 16.34 | 21.75 |
| $Ba^{2+}$ | 9.35 | 13.3 | 8.24 | 16.24 | 11.17 | 7.35 | 12.12 | 15.13 | 10.35 | 9.92 |
| $Sr^{2+}$ | 30.41 | 13.5 | 25.14 | 17.06 | 18.56 | 32.14 | 25.04 | 24.32 | 26.1 | 18.77 |
| $Ca^{2+}$ | 5.26 | 18.74 | 13.26 | 10.1 | 8.14 | 7.15 | 6.74 | 2.34 | 9.15 | 14.74 |
| $Mg^{2+}$ | 2.34 | 12.4 | 4.05 | 3.22 | 5.23 | 3.52 | 4.78 | 5.62 | 9.21 | 7.36 |
| $Gd^{3+}$ | 0 | 2.51 | 4.26 | 2.62 | 3.41 | 4.09 | 2.68 | 2.51 | 3.14 | 1.26 |
| $Y^{3+}$ | 2.33 | 0 | 0 | 0 | 0 | 0 | 0.88 | 0 | 0 | 0.79 |
| $La^{3+}$ | 0.42 | 0 | 0 | 0 | 0 | 0.63 | 0 | 0 | 0 | 0 |
| $Yb^{3+}$ | 0 | 0 | 0 | 0 | 0 | 0.14 | 0 | 0 | 0 | 0 |
| $Li^+$ | 0 | 0 | 0 | 0 | 0 | 0 | 2.16 | 0 | 0 | 0 |
| $Na^+$ | 1.52 | 1.86 | 1.56 | 0 | 0.86 | 3.04 | 2.04 | 1.2 | 0.2 | 0 |
| $K^+$ | 0.34 | 0 | 0 | 0 | 0 | 0 | 0 | 0 | 0 | 0 |
| $Zn^{2+}$ | 0 | 0 | 0 | 0 | 0 | 0 | 0 | 0 | 0 | 0 |
| $Nb^{5+}$ | 0.5 | 0 | 0 | 0 | 0 | 0 | 0 | 0 | 0 | 0 |
| $Ti^{4+}$ | 0 | 0 | 0 | 0 | 0 | 0 | 0 | 0 | 0 | 0 |
| $Zr^{4+}$ | 2.63 | 0 | 0 | 0 | 0 | 0 | 0 | 0 | 0 | 0 |
| $\Sigma cations$ | 100 | 100 | 100 | 100 | 100 | 100 | 100 | 100 | 100 | 100 |
| $F^-$ | 69.35 | 73.12 | 70.18 | 71.26 | 76.22 | 64.39 | 67.24 | 63.47 | 67.53 | 64.06 |
| $O^{2-}$ | 30.65 | 26.88 | 29.82 | 28.74 | 23.78 | 35.61 | 32.76 | 36.53 | 32.47 | 35.94 |
| $\Sigma anions$ | 100 | 100 | 100 | 100 | 100 | 100 | 100 | 100 | 100 | 100 |
| $F^-/P^{5+}$ | 5.0694 | 4.2144 | 2.6848 | 3.0649 | 2.8063 | 3.5128 | 3.0872 | 3.8166 | 2.6472 | 2.5211 |
| $Sr^{2+}/(Gd^{3+} + Na^+)$ | 20.007 | 3.0892 | 4.3196 | 6.5115 | 4.3466 | 4.5077 | 5.3051 | 6.5553 | 7.8144 | 14.897 |
| $Gd^{3+} + Y^{3+} + La^{3+} + Yb^{3+}$ | 2.75 | 2.51 | 4.26 | 2.62 | 3.41 | 4.86 | 3.56 | 2.51 | 3.14 | 2.05 |
| $Na^+/(Gd^{3+} + Na^+)$ | 0 | 0.4256 | 0.268 | 0 | 0.2014 | 0.4264 | 0.4322 | 0.3235 | 0.0599 | 0 |
| $n_d$ | 1.5106 | 1.5034 | 1.5068 | 1.4968 | 1.4759 | 1.5208 | 1.4982 | 1.4896 | 1.5026 | 1.4935 |
| $v_d$ | 80.14 | 81.86 | 81.95 | 82.34 | 83.62 | 79.88 | 81.34 | 79.58 | 81.95 | 80.81 |
| Tg (° C.) | 450.5 | 447.6 | 446.2 | 451.2 | 443.6 | 445.1 | 444.9 | 449.2 | 443.1 | 442.6 |
| $\rho$ (g/cm$^3$) | 4.07 | 4.08 | 3.93 | 3.96 | 4.02 | 3.96 | 4.11 | 3.95 | 3.95 | 3.94 |
| RC(S) | 1 | 1 | 1 | 1 | 1 | 1 | 1 | 1 | 1 | 1 |
| RA(S) | 1 | 1 | 1 | 1 | 1 | 1 | 1 | 1 | 1 | 1 |
| $\lambda 80/\lambda 5$ | 334/281 | 323/274 | 326/275 | 330/279 | 325/276 | 325/272 | 320/264 | 324/270 | 329/278 | 331/280 |

TABLE 3

| Components | Examples | | | | | | | | | |
|---|---|---|---|---|---|---|---|---|---|---|
| | 21 | 22 | 23 | 24 | 25 | 26 | 27 | 28 | 29 | 30 |
| $P^{5+}$ | 22.45 | 21.76 | 21.79 | 23.14 | 20.34 | 22.36 | 24.36 | 22.36 | 23.28 | 22.42 |
| $Al^{3+}$ | 22.16 | 23.06 | 22.07 | 20.23 | 23.52 | 21.85 | 20.55 | 22.08 | 23.45 | 21.85 |
| $Ba^{2+}$ | 12.62 | 13.47 | 13.85 | 11.42 | 13.54 | 12.33 | 10.64 | 12.27 | 11.26 | 12.24 |
| $Sr^{2+}$ | 27.34 | 28.54 | 26.34 | 27.45 | 26.88 | 28.05 | 26.34 | 27.69 | 25.34 | 27.33 |
| $Ca^{2+}$ | 6.25 | 8.42 | 5.67 | 9.52 | 7.64 | 7.34 | 5.19 | 7.06 | 6.38 | 7.26 |
| $Mg^{2+}$ | 3.26 | 3.14 | 4.25 | 2.36 | 2.53 | 3.65 | 5.26 | 3.21 | 3.47 | 3.38 |
| $Gd^{3+}$ | 3.58 | 1.27 | 3.42 | 3.52 | 3.62 | 3.22 | 4.15 | 3.56 | 4.36 | 3.85 |
| $Y^{3+}$ | 0 | 0.34 | 0 | 0 | 0 | 0 | 0 | 0 | 0 | 0 |
| $La^{3+}$ | 0 | 0 | 0 | 0.22 | 0 | 0 | 0 | 0 | 0 | 0 |
| $Yb^{3+}$ | 0 | 0 | 0 | 0 | 0 | 0 | 0.34 | 0 | 0 | 0 |
| $Li^+$ | 0 | 0 | 0 | 0 | 0 | 0 | 0.16 | 0 | 0 | 0 |
| $Na^+$ | 2.34 | 0 | 2.61 | 2.14 | 1.93 | 1.2 | 3.01 | 1.77 | 2.46 | 1.67 |
| $K^+$ | 0 | 0 | 0 | 0 | 0 | 0 | 0 | 0 | 0 | 0 |
| $Zn^{2+}$ | 0 | 0 | 0 | 0 | 0 | 0 | 0 | 0 | 0 | 0 |
| $Nb^{5+}$ | 0 | 0 | 0 | 0 | 0 | 0 | 0 | 0 | 0 | 0 |
| $Ti^{4+}$ | 0 | 0 | 0 | 0 | 0 | 0 | 0 | 0 | 0 | 0 |
| $Zr^{4+}$ | 0 | 0 | 0 | 0 | 0 | 0 | 0 | 0 | 0 | 0 |
| $\Sigma$cations | 100 | 100 | 100 | 100 | 100 | 100 | 100 | 100 | 100 | 100 |
| $F^-$ | 66.56 | 65.24 | 65.66 | 68.29 | 66.28 | 66.39 | 70.65 | 69.34 | 71.39 | 66.94 |
| $O^{2-}$ | 33.44 | 34.76 | 34.34 | 31.71 | 33.72 | 33.61 | 29.35 | 30.66 | 28.61 | 33.06 |
| $\Sigma$anions | 100 | 100 | 100 | 100 | 100 | 100 | 100 | 100 | 100 | 100 |
| $F^-/P^{5+}$ | 2.9648 | 2.9982 | 3.0133 | 2.9512 | 3.2586 | 2.9691 | 2.9002 | 3.1011 | 3.0666 | 2.9857 |
| $Sr^{2+}/(Gd^{3+} + Na^+)$ | 4.6182 | 22.472 | 4.3682 | 4.8498 | 4.8432 | 6.3462 | 3.6788 | 5.1951 | 3.7155 | 4.9511 |
| $Gd^{3+} + Y^{3+} + La^{i+} + Yb^{3+}$ | 3.58 | 1.61 | 3.42 | 3.74 | 3.62 | 3.22 | 4.49 | 3.56 | 4.36 | 3.85 |
| $Na^+/(Gd^{3+} + Na^+)$ | 0.3953 | 0 | 0.4328 | 0.3781 | 3.3477 | 0.2715 | 0.4204 | 0.3321 | 0.3607 | 0.3025 |
| $n_d$ | 1.4975 | 1.4968 | 1.4982 | 1.4988 | 1.5037 | 1.5052 | 1.4958 | 1.4967 | 1.4974 | 1.4985 |
| $v_d$ | 81.84 | 80.96 | 81.37 | 81.67 | 81.52 | 80.84 | 81.36 | 80.82 | 81.77 | 81.7 |
| Tg (° C.) | 444.9 | 447.6 | 445.2 | 442.3 | 445.8 | 446.2 | 445.8 | 447.6 | 445.3 | 442.5 |
| $\rho$ (g/cm³) | 3.93 | 3.9 | 4.06 | 4.02 | 4.03 | 3.94 | 13.92 | 3.91 | 3.98 | 3.95 |
| RC(S) | 1 | 1 | 1 | 1 | 1 | 1 | 1 | 1 | 1 | 1 |
| RA(S) | 1 | 1 | 1 | 1 | 1 | 1 | 1 | 1 | 1 | 1 |
| λ80/λ5 | 324/274 | 336/283 | 323/268 | 326/274 | 325/275 | 326/277 | 323/274 | 328/276 | 325/275 | 326/275 |

TABLE 4

| Components | Examples | | | | | | | | | |
|---|---|---|---|---|---|---|---|---|---|---|
| | 31 | 32 | 33 | 34 | 35 | 36 | 37 | 38 | 39 | 40 |
| $P^{5+}$ | 21.52 | 22.39 | 23.52 | 22.06 | 21.52 | 22.4 | 20.75 | 23.85 | 22.52 | 21.85 |
| $Al^{3+}$ | 21.46 | 24.16 | 20.47 | 21.75 | 23.4 | 22.3 | 25.31 | 21.6 | 21.63 | 21.36 |
| $Ba^{2+}$ | 11.37 | 12.37 | 13.35 | 12.52 | 12.47 | 11.58 | 12.27 | 12.33 | 13.25 | 12.34 |
| $Sr^{2+}$ | 29.34 | 27.62 | 26.52 | 28.34 | 27.52 | 26.34 | 25.33 | 28.5 | 25.34 | 27.45 |
| $Ca^{2+}$ | 6.85 | 5.3 | 6.38 | 7.64 | 7.36 | 6.21 | 6.81 | 7.36 | 8.15 | 6.85 |
| $Mg^{2+}$ | 42.56 | 2.6 | 3.56 | 3.39 | 3.28 | 3.2 | 3.26 | 4.15 | 3.52 | 4.15 |
| $Gd^{3+}$ | 2.74 | 3.4 | 3.43 | 2.96 | 3.11 | 3.06 | 3.74 | 2.03 | 3.36 | 3.52 |
| $Y^{3+}$ | 0.66 | 0 | 0 | 0 | 0 | 0.27 | 0 | 0 | 0 | 0 |
| $La^{3+}$ | 0.52 | 0 | 0 | 0 | 0 | 0 | 0 | 0 | 0 | 0 |
| $Yb^{3+}$ | 0 | 0 | 0 | 0 | 0 | 0 | 0 | 0 | 0 | 0 |
| $Li^+$ | 0 | 0 | 0 | 0 | 0 | 0.36 | 0 | 0 | 0 | 0 |
| $Na^+$ | 2.98 | 0.9 | 2.77 | 1.34 | 1.34 | 3.19 | 2.53 | 0.18 | 1.23 | 2.48 |
| $K^+$ | 0 | 0 | 0 | 0 | 0 | 0 | 0 | 0 | 0.25 | 0 |
| $Zn^{2+}$ | 0 | 0 | 0 | 0 | 0 | 0.34 | 0 | 0 | 0 | 0 |
| $Nb^{5+}$ | 0 | 0 | 0 | 0 | 0 | 0 | 0 | 0 | 0.75 | 0 |
| $Ti^{4+}$ | 0 | 1.26 | 0 | 0 | 0 | 0 | 0 | 0 | 0 | 0 |
| $Zr^{4+}$ | 0 | 0 | 0 | 0 | 0 | 0.75 | 0 | 0 | 0 | 0 |
| $\Sigma$cations | 100 | 100 | 100 | 100 | 100 | 100 | 100 | 100 | 100 | 100 |
| $F^-$ | 72.15 | 73.25 | 69.15 | 67.25 | 66.32 | 68.34 | 65.28 | 71.26 | 69.33 | 67.26 |
| $O^{2-}$ | 27.85 | 26.75 | 30.85 | 32.75 | 33.68 | 31.66 | 34.72 | 28.74 | 30.67 | 32.74 |
| $\Sigma$anions | 100 | 100 | 100 | 100 | 100 | 100 | 100 | 100 | 100 | 100 |
| $F^-/P^{5+}$ | 3.3527 | 3.2715 | 2.9401 | 3.0485 | 3.0818 | 3.0509 | 3.146 | 2.9878 | 3.0786 | 3.0783 |
| $Sr^{2+}/(Gd^{3+} + Na^+)$ | 5.1294 | 6.4233 | 4.2774 | 6.5907 | 6.1843 | 4.2144 | 4.0399 | 12.896 | 5.5207 | 4.575 |
| $Gd^{3+} + Y^{3+} + La^{3+} + Yb^{3+}$ | 3.92 | 3.4 | 3.43 | 2.96 | 3.11 | 3.33 | 3.74 | 2.03 | 3.36 | 3.52 |
| $Na^+/(Gd^{3+} + Na^+)$ | 0.521 | 0.2093 | 0.4468 | 0.3116 | 0.3011 | 0.5104 | 0.4035 | 0.0814 | 0.268 | 0.4133 |
| $n_d$ | 1.4982 | 1.4979 | 1.4967 | 1.4966 | 1.4982 | 1.5034 | 1.4975 | 1.4957 | 1.4979 | 1.5067 |
| $v_d$ | 81.36 | 81.95 | 81.79 | 81.85 | 81.73 | 81.56 | 82.06 | 81.74 | 81.85 | 80.75 |
| Tg (° C.) | 445.8 | 443.7 | 445.5 | 445.6 | 446.2 | 447.5 | 446.2 | 447.1 | 448.2 | 446.8 |

TABLE 4-continued

| | Examples | | | | | | | | | |
|---|---|---|---|---|---|---|---|---|---|---|
| Components | 31 | 32 | 33 | 34 | 35 | 36 | 37 | 38 | 39 | 40 |
| ρ (g/cm³) | 3.92 | 3.94 | 3.93 | 3.92 | 4.01 | 3.95 | 4.02 | 3.95 | 3.91 | 3.98 |
| RC(S) | 1 | 1 | 1 | 1 | 1 | 1 | 1 | 1 | 1 | 1 |
| RA(S) | 1 | 1 | 1 | 1 | 1 | 1 | 1 | 1 | 1 | 1 |
| λ80/λ5 | 325/274 | 327/276 | 324/273 | 325/276 | 326/278 | 322/269 | 323/271 | 332/281 | 327/276 | 325/277 |

TABLE 5

| | Examples | | | | | | | | | |
|---|---|---|---|---|---|---|---|---|---|---|
| Components | 41 | 42 | 43 | 44 | 45 | 46 | 47 | 48 | 49 | 50 |
| $P^{5+}$ | 21.32 | 25.33 | 22.41 | 19.86 | 22.51 | 22.35 | 21.51 | 21.52 | 20.74 | 24.26 |
| $Al^{3+}$ | 26.41 | 18.35 | 21.63 | 27.25 | 21.35 | 22.16 | 22.3 | 21.34 | 25.34 | 23.34 |
| $Ba^{2+}$ | 7.65 | 16.37 | 13.2 | 11.64 | 12.22 | 11.85 | 12.25 | 12.38 | 9.24 | 10.22 |
| $Sr^{2+}$ | 25.13 | 23.52 | 28.45 | 26.37 | 27.4 | 27.36 | 26.17 | 27.34 | 23.34 | 25.5 |
| $Ca^{2+}$ | 8.24 | 6.41 | 7.95 | 7.06 | 10.23 | 6.84 | 7.34 | 5.16 | 11.5 | 8.33 |
| $Mg^{2+}$ | 3.35 | 4.18 | 2.34 | 3.88 | 3.26 | 4.16 | 3.4 | 4.18 | 3.84 | 3.25 |
| $Gd^{3+}$ | 3.82 | 2.24 | 2.18 | 3.15 | 2.84 | 3.36 | 3.36 | 6.33 | 3.62 | 2.17 |
| $Y^{3+}$ | 0.35 | 0 | 1.84 | 0 | 0 | 1.92 | 0 | 0 | 0 | 0 |
| $La^{3+}$ | 1.22 | 0 | 0 | 0 | 0 | 0 | 0 | 0 | 0 | 0 |
| $Yb^{3+}$ | 0 | 0 | 0 | 0 | 0 | 0 | 0 | 0 | 0 | 0.34 |
| $Li^+$ | 0 | 0.28 | 0 | 0 | 0 | 0 | 0.84 | 0 | 0 | 0 |
| $Na^+$ | 2.51 | 2.96 | 0 | 0.79 | 0.19 | 0 | 2.83 | 1.75 | 2.15 | 1.75 |
| $K^+$ | 0 | 0 | 0 | 0 | 0 | 0 | 0 | 0 | 0.23 | 0 |
| $Zn^{2+}$ | 0 | 0.36 | 0 | 0 | 0 | 0 | 0 | 0 | 0 | 0 |
| $Nb^{5+}$ | 0 | 0 | 0 | 0 | 0 | 0 | 0 | 0 | 0 | 0 |
| $Ti^{4+}$ | 0 | 0 | 0 | 0 | 0 | 0 | 0 | 0 | 0 | 0.26 |
| $Zr^{4+}$ | 0 | 0 | 0 | 0 | 0 | 0 | 0 | 0 | 0 | 0.58 |
| Σcations | 100 | 100 | 100 | 100 | 100 | 100 | 100 | 100 | 100 | 100 |
| $F^-$ | 67.34 | 72.15 | 66.35 | 64.85 | 65.21 | 68.52 | 67.15 | 66.28 | 64.25 | 73.21 |
| $O^{2-}$ | 32.66 | 27.85 | 33.65 | 35.15 | 34.79 | 31.48 | 32.85 | 33.72 | 35.75 | 26.79 |
| Σanions | 100 | 100 | 100 | 100 | 100 | 100 | 100 | 100 | 100 | 100 |
| $F^-/P^{5+}$ | 3.1585 | 2.8484 | 2.9607 | 3.2654 | 2.8969 | 3.0658 | 3.1218 | 3.0799 | 3.0979 | 3.0177 |
| $Sr^{2+}/(Gd^{3+} + Na^+)$ | 3.97 | 4.5231 | 13.05 | 6.6929 | 9.0429 | 8.1429 | 4.2278 | 3.3837 | 4.0451 | 6.5051 |
| $Gd^{3+} + Y^{3+} + La^{3+} + Yb^{3+}$ | 5.39 | 2.24 | 4.02 | 3.15 | 2.84 | 5.28 | 3.36 | 6.33 | 3.62 | 2.51 |
| $Na^+/(Gd^{3+} + Na^+)$ | 0.3965 | 0.5692 | 0 | 0.2005 | 0.0627 | 0 | 0.4572 | 0.2166 | 0.3726 | 0.4464 |
| nd | 1.4968 | 1.5106 | 1.497 | 1.5067 | 1.4975 | 1.4992 | 1.4962 | 1.4972 | 1.4892 | 1.5032 |
| $v_d$ | 81.78 | 80.31 | 81.77 | 80.48 | 81.69 | 81.28 | 81.8 | 81.78 | 81.24 | 81.22 |
| Tg (° C.) | 444.9 | 446.5 | 445.2 | 447.8 | 445.8 | 451.4 | 444.7 | 445.2 | 446.2 | 447.1 |
| ρ (g/cm³) | 3.91 | 4.05 | 3.92 | 3.98 | 3.89 | 4.06 | 3.95 | 3.91 | 3.92 | 4.02 |
| RC(S) | 1 | 1 | 1 | 1 | 1 | 1 | 1 | 1 | 1 | 1 |
| RA(S) | 1 | 1 | 1 | 1 | 1 | 1 | 1 | 1 | 1 | 1 |
| λ80/λ5 | 324/275 | 326/277 | 331/279 | 328/276 | 329/278 | 328/279 | 322/271 | 325/274 | 324/274 | 324/273 |

TABLE 6

| | Examples | | | | | | | | | |
|---|---|---|---|---|---|---|---|---|---|---|
| Components | 51 | 52 | 53 | 54 | 55 | 56 | 57 | 58 | 59 | 60 |
| $P^{5+}$ | 26.31 | 24.38 | 21.06 | 18.24 | 20.68 | 21.25 | 23.36 | 22.53 | 21.34 | 22.61 |
| $Al^{3+}$ | 14.57 | 22.14 | 28.47 | 25.12 | 23.51 | 21.39 | 22.15 | 20.64 | 21.52 | 21.34 |
| $Ba^{2+}$ | 17.22 | 6.74 | 8.34 | 13.62 | 13.07 | 12.54 | 12.21 | 13.36 | 14.26 | 11.8 |
| $Sr^{2+}$ | 32.5 | 31.2 | 26.31 | 28.31 | 26.44 | 27.19 | 26.35 | 27.51 | 26.34 | 26.34 |
| $Ca^{2+}$ | 2.14 | 8.13 | 4.19 | 6.85 | 8.25 | 7.42 | 7.5 | 7.25 | 5.85 | 6.85 |
| $Mg^{2+}$ | 2.34 | 1.39 | 6.5 | 3.11 | 3.36 | 3.5 | 3.62 | 2.96 | 5.14 | 4.52 |
| $Gd^{3+}$ | 3.16 | 3.3 | 3.16 | 2.17 | 1.04 | 4.27 | 3.34 | 2.84 | 3.54 | 4.21 |
| $Y^{3+}$ | 0.52 | 0 | 0 | 0 | 2.65 | 0 | 0 | 0.35 | 0 | 0 |
| $La^{3+}$ | 0 | 0 | 0 | 0.63 | 0 | 0 | 0 | 0 | 0 | 0 |
| $Yb^{3+}$ | 0 | 0 | 0 | 0 | 0.34 | 0 | 0 | 0 | 0 | 0 |
| $Li^+$ | 0 | 0 | 0 | 0 | 0.66 | 0 | 0 | 0 | 0 | 0 |
| $Na^+$ | 1.24 | 2.72 | 1.97 | 1.95 | 0 | 2.44 | 1.13 | 2.56 | 1.49 | 2.33 |
| $K^+$ | 0 | 0 | 0 | 0 | 0 | 0 | 0 | 0 | 0 | 0 |
| $Zn^{2+}$ | 0 | 0 | 0 | 0 | 0 | 0 | 0.34 | 0 | 0 | 0 |
| $Nb^{5+}$ | 0 | 0 | 0 | 0 | 0 | 0 | 0 | 0 | 0 | 0 |

TABLE 6-continued

| Components | 51 | 52 | 53 | 54 | 55 | 56 | 57 | 58 | 59 | 60 |
|---|---|---|---|---|---|---|---|---|---|---|
| $Ti^{4+}$ | 0 | 0 | 0 | 0 | 0 | 0 | 0 | 0 | 0.52 | 0 |
| $Zr^{4+}$ | 0 | 0 | 0 | 0 | 0 | 0 | 0 | 0 | 0 | 0 |
| Σcations | 100 | 100 | 100 | 100 | 100 | 100 | 100 | 100 | 100 | 100 |
| $F^-$ | 69.35 | 68.58 | 66.38 | 64.39 | 65.24 | 70.26 | 72.16 | 66.34 | 66.85 | 67.52 |
| $O^{2-}$ | 30.65 | 31.42 | 33.62 | 35.61 | 34.76 | 29.74 | 27.84 | 33.66 | 33.15 | 32.48 |
| Σanions | 100 | 100 | 100 | 100 | 100 | 100 | 100 | 100 | 100 | 100 |
| $F^-/P^{5+}$ | 2.6359 | 2.813 | 3.1519 | 3.5302 | 3.1547 | 3.3064 | 3.089 | 2.9445 | 3.1326 | 2.9863 |
| $Sr^{2+}/(Gd^{3+} + Na^+)$ | 7.3864 | 5.1827 | 5.1287 | 6.8714 | 25.423 | 4.0522 | 5.8949 | 5.0944 | 5.2366 | 4.0275 |
| $Gd^{3+} + Y^{3+} + La^{3+} + Yb^{3+}$ | 3.68 | 3.3 | 3.16 | 2.8 | 4.03 | 4.27 | 3.34 | 3.19 | 3.54 | 4.21 |
| $Na^+/(Gd^{3+} + Na^+)$ | 0.2818 | 0.4518 | 0.384 | 0.4733 | 0 | 0.3636 | 0.2528 | 0.4741 | 0.2962 | 0.3563 |
| $n_d$ | 1.4975 | 1.4983 | 1.4972 | 1.4895 | 1.4952 | 1.4969 | 1.4975 | 1.4972 | 1.4977 | 1.4978 |
| $v_d$ | 82.74 | 82.03 | 81.57 | 80.73 | 81.67 | 81.8 | 81.34 | 81.27 | 81.34 | 81.58 |
| Tg (° C.) | 445.5 | 444.2 | 447.3 | 446.2 | 446.1 | 444.8 | 445.1 | 446.2 | 445.5 | 445.7 |
| ρ (g/cm³) | 3.92 | 3.94 | 4.05 | 4.01 | 4.03 | 3.92 | 3.94 | 3.91 | 3.91 | 3.94 |
| RC(S) | 1 | 1 | 1 | 1 | 1 | 1 | 1 | 1 | 1 | 1 |
| RA(S) | 1 | 1 | 1 | 1 | 1 | 1 | 1 | 1 | 1 | 1 |
| λ80/λ5 | 326/275 | 325/274 | 324/273 | 325/274 | 330/278 | 324/274 | 326/275 | 326/274 | 326/274 | 325/275 |

TABLE 7

| Components | 61 | 62 | 63 | 64 | 65 | 66 | 67 | 68 | 69 | 70 |
|---|---|---|---|---|---|---|---|---|---|---|
| $P^{5+}$ | 22.31 | 21.82 | 22.62 | 22.46 | 24.18 | 23.36 | 21.35 | 23.05 | 23.57 | 21.25 |
| $Al^{3+}$ | 22.5 | 21.64 | 21.17 | 21.34 | 23.24 | 20.28 | 22.15 | 22.14 | 22.16 | 21.74 |
| $Ba^{2+}$ | 12.41 | 13.3 | 12.36 | 12.25 | 12.22 | 13.47 | 12.24 | 12.16 | 12.27 | 13.25 |
| $Sr^{2+}$ | 27.26 | 26.54 | 28.31 | 27.47 | 25.26 | 26.64 | 27.5 | 26.84 | 24.11 | 26.24 |
| $Ca^{2+}$ | 6.85 | 6.94 | 5.92 | 7.65 | 7.15 | 7.25 | 7.16 | 6.47 | 8.71 | 7.15 |
| $Mg^{2+}$ | 3.34 | 3.5 | 2.64 | 3.32 | 3.26 | 4.41 | 2.26 | 3.26 | 4.15 | 4.05 |
| $Gd^{3+}$ | 3.26 | 3.29 | 4.36 | 3.88 | 2.75 | 3.67 | 3.7 | 3.17 | 3.26 | 3.58 |
| $Y^{3+}$ | 0 | 0 | 0.82 | 0 | 0 | 0 | 0 | 0 | 0 | 0 |
| $La^{3+}$ | 0 | 0.3 | 0 | 0 | 0 | 0 | 0 | 0 | 0 | 0 |
| $Yb^{3+}$ | 0 | 0 | 0 | 0 | 0 | 0 | 0 | 0.56 | 0 | 0 |
| $Li^+$ | 0 | 0 | 0 | 0 | 0 | 0 | 0 | 0.45 | 0 | 0 |
| $Na^+$ | 2.07 | 2.4 | 1.8 | 1.63 | 1.94 | 0.92 | 3 | 1.9 | 1.77 | 2.74 |
| $K^+$ | 0 | 0.27 | 0 | 0 | 0 | 0 | 0 | 0 | 0 | 0 |
| $Zn^{2+}$ | 0 | 0 | 0 | 0 | 0 | 0 | 0.64 | 0 | 0 | 0 |
| $Nb^{5+}$ | 0 | 0 | 0 | 0 | 0 | 0 | 0 | 0 | 0 | 0 |
| $Ti^{4+}$ | 0 | 0 | 0 | 0 | 0 | 0 | 0 | 0 | 0 | 0 |
| $Zr^{4+}$ | 0 | 0 | 0 | 0 | 0 | 0 | 0 | 0 | 0 | 0 |
| Σcations | 100 | 100 | 100 | 100 | 100 | 100 | 100 | 100 | 100 | 100 |
| $F^-$ | 67.53 | 66.35 | 68.14 | 67.19 | 69.33 | 68.57 | 66.68 | 68.14 | 67.49 | 66.85 |
| $O^{2-}$ | 32.47 | 33.65 | 31.86 | 32.81 | 30.67 | 31.43 | 33.32 | 31.86 | 32.51 | 33.15 |
| Σanions | 100 | 100 | 100 | 100 | 100 | 100 | 100 | 100 | 100 | 100 |
| $F^-/P^{5+}$ | 3.0269 | 3.0408 | 3.0124 | 2.9915 | 2.8672 | 2.9354 | 3.1232 | 2.9562 | 2.8634 | 3.1459 |
| $Sr^{2+}/(Gd^{3+} + Na^+)$ | 5.1144 | 4.6643 | 4.5958 | 4.9855 | 5.3859 | 5.8039 | 4.1045 | 5.2939 | 4.7932 | 4.1519 |
| $Gd^{3+} + Y^{3+} + La^{3+} + Yb^{3+}$ | 3.26 | 3.59 | 5.18 | 3.88 | 2.75 | 3.67 | 3.7 | 3.73 | 3.26 | 3.58 |
| $Na^+/(Gd^{3+} + Na^+)$ | 0.3884 | 0.4218 | 0.2922 | 0.2958 | 0.4136 | 0.2004 | 0.4478 | 0.3748 | 0.3519 | 0.4335 |
| $n_d$ | 1.4965 | 1.4973 | 1.4985 | 1.4975 | 1.5019 | 1.4962 | 1.4969 | 1.4974 | 1.4938 | 1.4975 |
| $v_d$ | 81.74 | 81.69 | 81.67 | 81.56 | 80.97 | 81.55 | 81.66 | 81.73 | 82.07 | 81.74 |
| Tg (° C.) | 445.2 | 444.2 | 442.8 | 445.2 | 443.6 | 447.1 | 443.7 | 444.8 | 445.4 | 444.6 |
| ρ (g/cm³) | 3.93 | 3.92 | 4.01 | 3.91 | 3.95 | 3.93 | 3.92 | 3.93 | 3.91 | 3.92 |
| RC(S) | 1 | 1 | 1 | 1 | 1 | 1 | 1 | 1 | 1 | 1 |
| RA(S) | 1 | 1 | 1 | 1 | 1 | 1 | 1 | 1 | 1 | 1 |
| λ80/λ5 | 322/274 | 323/274 | 325/275 | 324/274 | 325/273 | 324/275 | 324/275 | 325/275 | 323/272 | 325/275 |

Optical Preform Examples

The optical glass obtained in examples 61-70 as shown in Table 7 were cut to a preset size, then uniformly coated with a mold release agent, subjected to heating, softening and press forming to make various performs of lenses and prisms (such as concave meniscus lenses, convex meniscus lenses, double convex lenses, double concave lenses, plano-convex lenses and plano-concave lenses). In the original molding process, the molded products have no breakage or fog formation, thus, the molding efficiency and the yield of products are greatly improved.

Optical Element Examples

The performs obtained in the foregoing optical preform examples were annealed, subject to minor adjusting while reducing the deformation inside the glass, so as to make the optical properties, such as the refractive index and the like, reach the desired value.

Next, each perform was milled and ground to make various lenses and prisms, such as concave meniscus lenses, convex meniscus lenses, double convex lenses, double concave lenses, plano-convex lenses and plano-concave lenses and the like. The surface of the optical elements obtained can be coated with an anti-reflecting coating.

The optical glass of the invention is low-refraction low-dispersion glass with low cost and excellent transmittance and having a refractive index of 1.46-1.53 and an Abbe number of 77-84, and the optical elements formed with the glass can meet the needs for modern novel photoelectric products.

What is claimed:

1. An optical glass, comprising:
   the following components (calculated by cations) in molar percentages: $P^{5+}$: 10-35%, $Al^{3+}$: 10-35%, $Ba^{2+}$: 1-20%, $Sr^{2+}$: 10-35%, $Ca^{2+}$: 1-20%, $0<Gd^3+10\%$, and $0<Na^+$ 10%; the ratio of $Sr^{2+}/(Gd^{3+}+Na^+)$ being 1-30;
   anions comprising $F^-$ and $O^{2-}$, wherein a ratio $F^-/P^{5+}$ of $F^-$ content relative to the total molar percentage of the anions to $P^{5+}$ content relative to the total molar percentage of the cations is 2.5 or more.

2. The optical glass according to claim 1, further comprising the following components (calculated by based on the cations) in the molar percentages: additional cations:
   $Mg^{2+}$: 0-15%,
   $Y^{3+}$: 0-10%,
   $La^{3+}$: 0-10%,
   $Yb^{3+}$: 0-10%,
   $Li^+$: less than 4%,
   $K^+$: 0-10%,
   $Zn^{2+}$: 0-10%,
   $Nb^{5+}$: 0-10%,
   $Ti^{4+}$: 0-10%, and
   $Zr^{4+}$: 0-10%, wherein the percentages are molar percentages of the cations.

3. The optical glass according to claim 1, wherein: $P^{5+}$: 15-30%, and/or $Al^{3+}$: 15-25%, $Ba^{2+}$: 3-18%, $Sr^{2+}$: 15-35%, $Ca^{2+}$: 1-15%, $Mg^{2+}$: 1-10%, $Gd^{3+}$: 0.5-8%, $Na^+$: 0.5-8%, $Y^{3+}$: 0-5%, or $La^{3+}$: 0-5%, $Yb^{3+}$: 0-5%, $Li^+$: less than 1%, or $K^+$: 0-5%, $Zn^{2+}$: 0-5%, $Nb^{5+}$: 0-5%, and/or $Ti^{4+}$: 0-5%, or $Zr^{4+}$: 0-5%.

4. The optical glass according to claim 1, wherein: $P^{5+}$: 16-26%, $Al^{3+}$: 18-25%, $Ba^{2+}$: 5-15%, $Sr^{2+}$: 20-35%, $Ca^{2+}$: 1-10%, $Mg^{2+}$: 1-7%, $Gd^{3+}$: 1-5%, $Na^+$: 1-5%, $Y^{3+}$: 0-3%, $La^{3+}$: 0-1%, $Yb^{3+}$: 0-1%, $K^+$: 0-1%, $Zn^{2+}$: 0-1%, $Nb^{5+}$: 0-1%, $Ti^{4+}$: 0-1%, or $Zr^{4+}$: 0-1%.

5. The optical glass according to claim 1, wherein $Sr^{2+}/(Gd^{3+}+Na^+)$ is 1-18, the sum of $Gd^{3+}+Y^{3+}+La^{3+}+Yb^{3+}$ is 1-20%, $0<Na^+/(Gd^{3+}+Na^+)\leq0.8$, $Sr^{2+}/(Gd^{3+}+Y3^+)$ is 3-18, or $Sr^{2+}>P^{5+}$.

6. The optical glass according to claim 1, wherein $F^-/P^{5+}$ is 2.5-5.5, $Sr^{2+}/(Gd^{3+}+Na^+)$ is 2-10, the sum of $Gd^{3+}+Y^{3+}+La^{3+}+Yb^{3+}$ is 1-10%, and/or $Na^+/(Gd^{3+}+Na^+)$ is 0.2-0.7, $Sr^{2+}/(Gd^{3+}+Y^{3+})$ is 3-15, or $Sr^{2+}>P^{5+}+1\%$.

7. The optical glass according to claim 1, wherein based on the molar percentage of anions comprising: $F^-$: 60-80%, and $O^{2-}$: 20-40%.

8. The optical glass according to claim 1, wherein the refractive index is 1.46-1.53; the Abbe number is 77-84; the transition temperature is 470° C. or less; the resistance to moisture atmospheric stability is above Grade 2; the acid resistance stability is above Grade 2; the density is 4.30 g/cm³ or less; when the transmittance is 80%, the corresponding wavelength $\lambda_{80}$ is less than or equal to 340 nm, and when the transmittance is 5%, the corresponding wavelength $\lambda_5$ is less than or equal to 290 nm.

9. An optical element, made of the optical glass according to claim 1.

10. The optical glass according to claim 1, wherein: $P^{5+}$: 15-30%, $Al^{3+}$: 15-25%, $Ba^{2+}$: 3-18%, $Sr^{2+}$: 15-35%, $Ca^{2+}$: 1-15%, $Mg^{2+}$: 1-10%, $Gd^{3+}$: 0.5-8%, $Na^+$: 0.5-8%, $Y^{3+}$: 0-5%, $La^{3+}$: 0-5%, $Yb^{3+}$: 0-5%, $Li^+$: less than 1%, $K^+$: 0-5%, $Zn^{2+}$: 0-5%, $Nb^{5+}$: 0-5%, $Ti^{4+}$: 0-5%, and $Zr^{4+}$: 0-5%.

11. The optical glass according to claim 1, wherein: $P^{5+}$: 16-26%, $Al^{3+}$: 18-25%, $Ba^{2+}$: 5-15%, $Sr^{2+}$: 20-35%, $Ca^{2+}$: 1-10%, $Mg^{2+}$: 1-7%, $Gd^{3+}$: 1-5%, $Na^+$: 1-5%, $Y^{3+}$: 0-3%, $La^{3+}$: 0-1%, $Yb^{3+}$: 0-1%, $K^+$: 0-1%, $Zn^{2+}$: 0-1%, $Nb^{5+}$: 0-1%, $Ti^{4+}$: 0-1%, and $Zr^{4+}$: 0-1%.

12. The optical glass according to claim 1, wherein $Sr^{2+}/(Gd^{3+}+Na^+)$ is 1-18, the sum of $Gd^{3+}+Y^{3+}+La^{3+}+Yb^{3+}$ is 1-20%, $0<Na^+/(Gd^{3+}+Na^+)$ $Sr^{2+}/(Gd^{3+}+Y^{3+})$ is 3-18, and $Sr^{2+}>P^{5+}$.

13. The optical glass according to claim 1, wherein $F^-/P^{5+}$ is 2.5-5.5, $Sr^{2+}/(Gd^{3+}+Na^+)$ is 2-10, the sum of $Gd^{3+}+Y^{3+}+La^{3+}+Yb^{3+}$ is 1-10%, $Na^+/(Gd^{3+}+Na^+)$ is 0.2-0.7, $Sr^{2+}/(Gd^{3+}+Y^{3+})$ is 3-15, and $Sr^{2+}>P^{5+}+1\%$.

14. An optical glass, comprising the following components based on the cations in the molar percentage: $P^{5+}$: 10-35%, $Al^{3+}$: 10-35%, $Ba^{2+}$: 1-20%, $Sr^{2+}$: 10-35%, $Ca^{2+}$: 1-20%, $Mg^{2+}$: 0-15%, $0<Gd^{3+}\leq10\%$, $Y^{3+}$: 0-10%, $0<Na^+\leq10\%$; $La^{3+}$: 0-10%, $Yb^{3+}$: 0-10%, $Li^+$: less than 4%, $K^+$: 0-10%, $Zn^{2+}$: 0-10%, $Nb^{5+}$: 0-10%, $Ti^{4+}$: 0-10%, $Zr^{4+}$: 0-10%, and $0<Na^+/(Gd^{3+}+Na^+)\leq0.8$.

15. The optical glass according to claim 14, wherein: $P^{5+}$: 15-30%, $Al^{2+}$: 15-25%, $Ba^{2+}$: 3-18%, $Sr^{2+}$: 15-35%, $Ca^{2+}$: 1-15%, $Mg^{2+}$: 1-10%, $Gd^{3+}$: 0.5-8%, $Na^+$: 0.5-8%, $Y^{3+}$: 0-5%, $La^{3+}$: 0-5%, $Yb^{3+}$: 0-5%, $Li^+$: less than 1%, $K^+$: 0-5%, $Zn^{2+}$: 0-5%, $Nb^{5+}$: 0-5%, $Ti^{4+}$: 0-5%, and $Zr^{4+}$: 0-5%.

16. The optical glass according to claim 14, wherein: $P^{5+}$: 16-26%, $Al^{3+}$: 18-25%, $Ba^{2+}$: 5-15%, $Sr^{2+}$: 20-35%, $Ca^{2+}$: 1-10%, $Mg^{2+}$: 1-7%, $Gd^{3+}$: 1-5%, $Na^+$: 1-5%, $Y^{3+}$: 0-3%, $La^{3+}$: 0-1%, $Yb^{3+}$: 0-1%, $K^+$: 0-1%, $Zn^{2+}$: 0-1%, $Nb^{2+}$: 0-1%, $Ti^{4+}$: 0-1%, and $Zr^{4+}$: 0-1%.

17. The optical glass according to claim 14, wherein $Sr^{2+}/(Gd^{3+}+Na^+)$ is 1-18, the sum of $Gd^{3+}+Y^{3+}+La^{3+}+Yb^{3+}$ is 1-20%, $Sr^{2+}/(Gd^{3+}+Y^{3+})$ is 3-18, and $Sr^{2+}>P^{5+}$.

18. The optical glass according to claim 14, wherein $F^-/P^{5+}$ is 2.5-5.5, $Sr^{2+}/(Gd^{3+}+Na+)$ is 2-10, the sum of $Gd^{3+}+Y^{3+}+La^{3+}+Yb^{3+}$ is 1-10%, $Na+/(Gd^{3+}+Na+)$ is 0.2-0.7, $Sr^{2+}/(Gd^{3+}+Y^{3+})$ is 3- 15, and $Sr^{2+}>P^5++1\%$.

19. The optical glass according to claim 14, wherein based on the molar percentage of anions comprising: $F^-$: 60-80%, and $O^{2-}$: 20-40%.

20. The optical glass according to claim 14, wherein the refractive index is 1.46-1.53; the Abbe number is 77-84; the transition temperature is 470° C. or less; the resistance to moisture atmospheric stability is above Grade 2; the acid resistance stability is above Grade 2; the density is 4.30 g/cm³ or less; when the transmittance is 80%, the corresponding wavelength $\lambda_{80}$ is less than or equal to 340 nm, and when the transmittance is 5%, the corresponding wavelength $\lambda_5$ is less than or equal to 290 nm.

* * * * *